(12) United States Patent
Kume et al.

(10) Patent No.: US 11,699,936 B2
(45) Date of Patent: Jul. 11, 2023

(54) ROTARY ACTUATOR HAVING BOARD FIXING MEMBER MESHING WITH CASE FASTENING MEMBER

(71) Applicant: DENSO CORPORATION, Kariya (JP)

(72) Inventors: Mikine Kume, Kariya (JP); Hiroyuki Kado, Kariya (JP)

(73) Assignee: DENSO CORPORATION, Kariya (JP)

( * ) Notice: Subject to any disclaimer, the term of this patent is extended or adjusted under 35 U.S.C. 154(b) by 333 days.

(21) Appl. No.: 16/847,801

(22) Filed: Apr. 14, 2020

(65) Prior Publication Data

US 2020/0336040 A1 Oct. 22, 2020

(30) Foreign Application Priority Data

Apr. 16, 2019 (JP) .............................. JP2019-077982

(51) Int. Cl.
*H02K 5/04* (2006.01)
*H02K 5/22* (2006.01)
*H02K 11/33* (2016.01)
*F16H 63/34* (2006.01)

(52) U.S. Cl.
CPC .............. *H02K 5/225* (2013.01); *H02K 5/04* (2013.01); *H02K 11/33* (2016.01); *F16H 63/3466* (2013.01); *H02K 2203/03* (2013.01)

(58) Field of Classification Search
CPC ............ H02K 5/04; H02K 5/08; H02K 5/225; H02K 11/30; H02K 11/33; F16H 63/3466
See application file for complete search history.

(56) References Cited

U.S. PATENT DOCUMENTS

| 2009/0140599 | A1 | 6/2009 | Yoshiyama et al. | |
| 2010/0007228 | A1 | 1/2010 | Hatano et al. | |
| 2010/0186531 | A1* | 7/2010 | Miyagawa | F16H 61/32 74/606 R |
| 2016/0218583 | A1* | 7/2016 | Hayashi | H02K 11/33 |
| 2016/0248292 | A1* | 8/2016 | Takarai | H05K 5/061 |
| 2016/0369797 | A1* | 12/2016 | Pribanic | H02K 11/0094 |
| 2017/0324300 | A1* | 11/2017 | Yamashita | H02K 5/24 |

(Continued)

FOREIGN PATENT DOCUMENTS

| JP | 2008-72776 | 3/2008 |
| JP | 2009-162268 | 7/2009 |

(Continued)

OTHER PUBLICATIONS

Nihira et al., Machine Translation of WO2020168400, Oct. 2020 (Year: 2020).*

(Continued)

*Primary Examiner* — Eric Johnson
(74) *Attorney, Agent, or Firm* — Nixon & Vanderhye P.C.

(57) ABSTRACT

A rotary actuator is used in a shift-by-wire system for a vehicle. The actuator includes a motor, a controller, an upper case, a lower case, a case fastening member, and a board fixing member. The controller controls the motor. The upper case is made from resin and houses the controller. The lower case houses the motor together with the upper case. The case fastening member is made from metal and fastens the upper case and the lower case to each other. The board fixing member fixes a board of the controller to the case fastening member.

6 Claims, 9 Drawing Sheets

(56) References Cited

U.S. PATENT DOCUMENTS

2018/0340594 A1    11/2018    Kume et al.
2019/0229588 A1    7/2019    Takahashi et al.

FOREIGN PATENT DOCUMENTS

WO    WO-2020039572 A1 *    2/2020    ............. B60R 16/03
WO    WO-2020195400 A1 *    10/2020

OTHER PUBLICATIONS

U.S. Appl. No. 16/847,953, filed Apr. 14, 2020, Rotary Actuator.
U.S. Appl. No. 16/847,974, filed Apr. 14, 2020, Rotary Actuator.
U.S. Appl. No. 16/847,989, filed Apr. 14, 2020, Rotary Actuator.
U.S. Appl. No. 16/847,788, filed Apr. 14, 2020, Rotary Actuator.
U.S. Appl. No. 16/847,801, filed Apr. 14, 2020, Rotary Actuator.
U.S. Appl. No. 16/847,820, filed Apr. 14, 2020, Rotary Actuator and Method of Manufacturing the Same.
U.S. Appl. No. 16/847,854, filed Apr. 14, 2020, Rotary Actuator.
U.S. Appl. No. 16/847,816, filed Apr. 14, 2020, Rotary Actuator.
U.S. Appl. No. 16/847,992, filed Apr. 14, 2020, Rotary Actuator.
U.S. Appl. No. 16/848,024, filed Apr. 14, 2020, Rotary Actuator.
U.S. Appl. No. 16/847,835, filed Apr. 14, 2020, Rotary Actuator.
U.S. Appl. No. 16/847,953, to Kume, et al., entitled: "Rotary Actuator", filed Apr. 14, 2020 (18 pages).
U.S. Appl. No. 16/847,974, to Kannou, et al., entitled: "Rotary Actuator", filed Apr. 14, 2020 (22 pages).
U.S. Appl. No. 16/847,989, to Kume, et al., entitled: "Rotary Actuator", filed Apr. 14, 2020 (20 pages).
U.S. Appl. No. 16/847,788 to Kume, et al., entitled: "Rotary Actuator", filed Apr. 14, 2020 (22 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,854, to Naitou, et al., entitled: "Rotary Actuator", filed Apr. 14, 2020 (23 pages).
U.S. Appl. No. 16/847,816, to Imai, et al., entitled: "Rotary Actuator", filed Apr. 14, 2020 (27 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).
U.S. Appl. No. 16/847,835, to Kannou, et al., entitled: "Rotary Actuator", filed Apr. 14, 2020 (18 pages).

* cited by examiner

ROTARY ACTUATOR HAVING BOARD FIXING MEMBER MESHING WITH CASE FASTENING MEMBER

CROSS REFERENCE TO RELATED APPLICATIONS

This application is based on Japanese Patent Application No. 2019-077982 filed on Apr. 16, 2019, all of which is incorporated herein by reference.

TECHNICAL FIELD

The present disclosure relates to a rotary actuator.

BACKGROUND

Conventionally, there has been known an electromechanical integrated rotary actuator in which an operating unit with a motor and a controller for controlling the motor are integrally formed. For example, a board of a control unit is housed in one case (hereinafter, an upper case) that houses a motor. The board is screwed to a metal upper case.

SUMMARY

One aspect of the present disclosure is a rotary actuator for a shift-by-wire system of a vehicle. The actuator includes a motor, a controller, an upper case, a lower case, a case fastening member, and a board fixing member. The controller controls the motor. The upper case is made from resin and houses the controller. The lower case houses the motor together with the upper case. The case fastening member is made from metal and fastens the upper case and the lower case to each other. The board fixing member fixes a board of the controller to the case fastening member.

DETAILED DESCRIPTION

Figure 1:
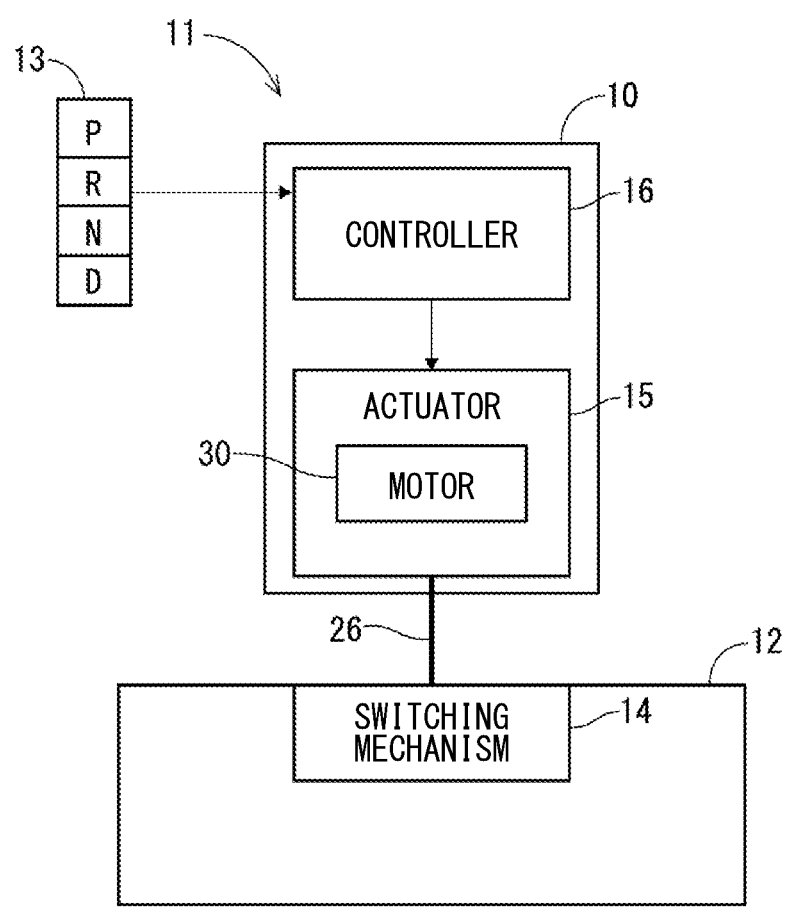
FIG. 1 is a schematic diagram showing a shift-by-wire system to which a rotary actuator according to a first embodiment is applied.

Hereinafter, a plurality of embodiments of a rotary actuator (hereinafter, actuator) will be described with reference to the drawings. In the embodiments, substantially the same components are denoted by the same reference numerals and description thereof is omitted.

To begin with, relevant technologies will be described only for explanatory purposes of the following embodiments. Typically, since an upper case is made of metal, there is a concern that the mass of a rotary actuator may be increased. The large mass would result in a reduction in vehicle fuel efficiency and a reduction in vibration resistance. Further, since such a metal upper case has lower corrosion resistance, there is a concern that the sealing property of the case cannot be secured due to corrosion of the sealing surface between the upper case and other case components.

The present disclosure has been provided in view of the above, and the present disclosure provides a rotary actuator that has a reduced weight and an improved sealing property for the case as will described below.

One aspect of the present disclosure is a rotary actuator for a shift-by-wire system of a vehicle. The actuator includes a motor, a controller, an upper case, a lower case, a case fastening member, and a board fixing member. The controller controls the motor. The upper case is made from resin and houses the controller. The lower case houses the motor together with the upper case. The case fastening member is made from metal and fastens the upper case and the lower case to each other. The board fixing member fixes a board of the controller to the case fastening member.

By using the upper case made of resin, the case can be made lighter and the corrosion resistance is improved. As a result, the weight of the rotary actuator can be reduced, and sealing for the case can be ensured.

In order to ensure the vibration resistance of the controller, the board of the controller needs to be fixed to the metal part. Therefore, for example, an insert nut may be integrally formed with the upper case, and the board may be fixed to the insert nut. However, there is a concern that the size of the upper case may be increased due to the existence of the insert nut and, as a result, the size of the rotary actuator may be increased.

By fixing the board using the metal case fastening member in the one aspect, it is not necessary to provide an insert nut in the upper case while securing the vibration resistance of the controller. This can prevent the rotary actuator from increasing in physical size. In addition, by having the case fastening member with the function equivalent to the insert nut for fixing the board, the insert nut is not necessary, and thus the number of components can be reduced.

By reducing the weight and size of the rotary actuator as described above, the mountability and vibration resistance of the rotatory actuator can be improved.

First Embodiment

In this embodiment, an actuator is used as a driver of a shift-by-wire system for a vehicle.
(Shift-by-Wire System)

The configuration of the shift-by-wire system will be described with reference to FIGS. 1 and 2. As shown in FIG. 1, the shift-by-wire system 11 includes a shift operation device 13 that outputs an instruction (i.e., a command signal) to designate a shift range to the transmission 12 and an actuator 10 that operates a shift range switching mechanism 14 of the transmission 12. The actuator 10 includes an operating unit 15 that has a motor 30 and a controller 16 that controls the motor 30 in response to a shift range instruction signal.

Figure 2:
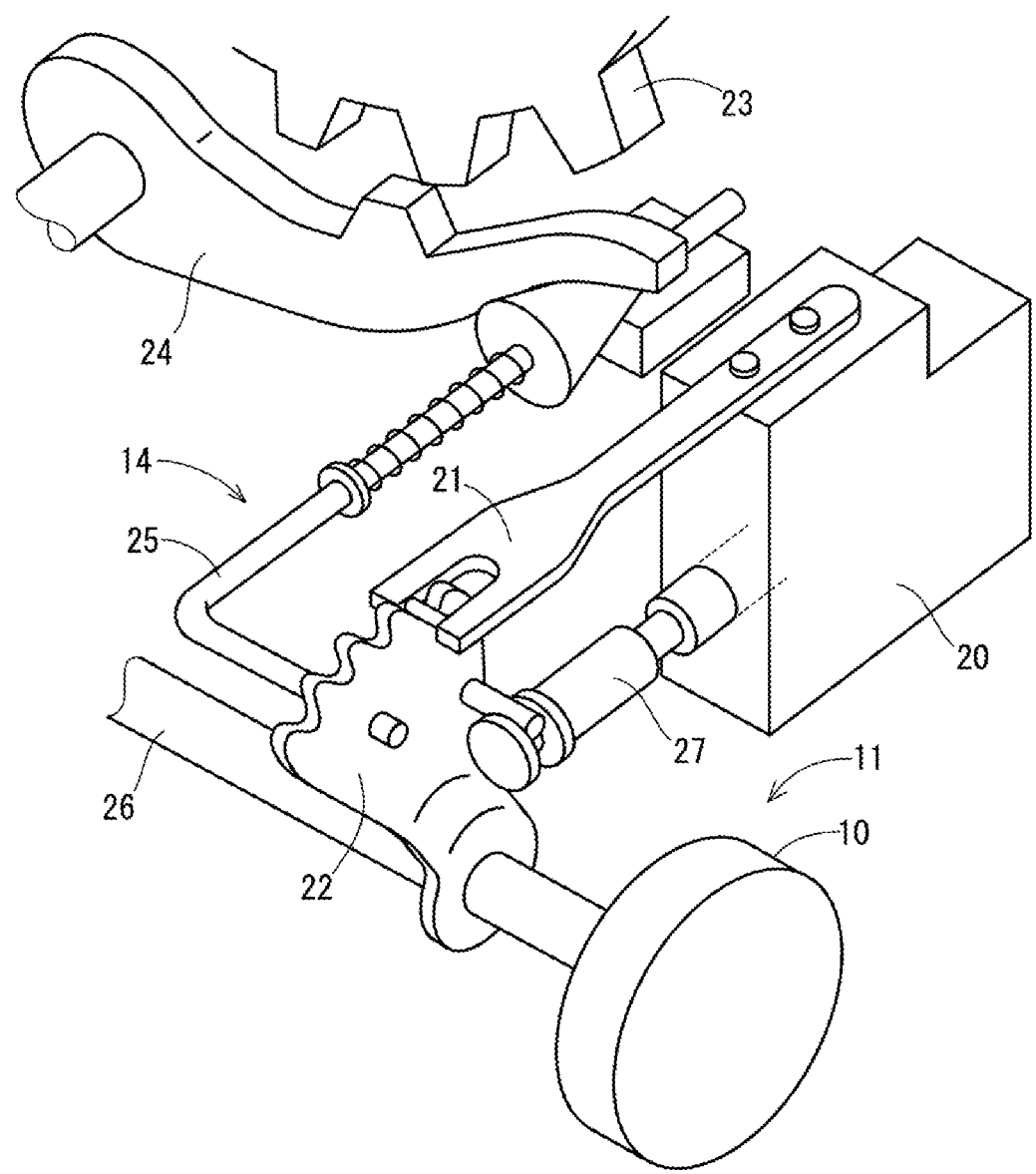
FIG. 2 is a diagram illustrating a shift range switching mechanism of FIG.

As shown in FIG. 2, the shift range switching mechanism 14 includes a range switching valve 20, a detent spring 21 and a detent lever 22, a park pole 24, and a manual shaft 26. The range switching valve 20 controls a supply of hydraulic pressure to a hydraulic operating mechanism in the transmission 12 (see FIG. 1). The detent spring 21 and a detent lever 22 are configured to keep a shift range. The park rod 25 is configured to prevent an output shaft from rotating by fitting the park pole 24 into a park gear 23 of the output shaft of the transmission 12 when the shift range is switched to a parking range. The manual shaft 26 rotates together with the detent lever 22.

The shift range switching mechanism 14 rotates the detent lever 22 together with the manual shaft 26 to move a valve body 27 and the park rod 25 of the range switching valve 20 connected to the detent lever 22 to a position corresponding to a target shift range. In the shift-by-wire system 11, the actuator 10 is connected to the manual shaft 26 in order to perform the shift range change electrically.

(Actuator)

Figure 3:
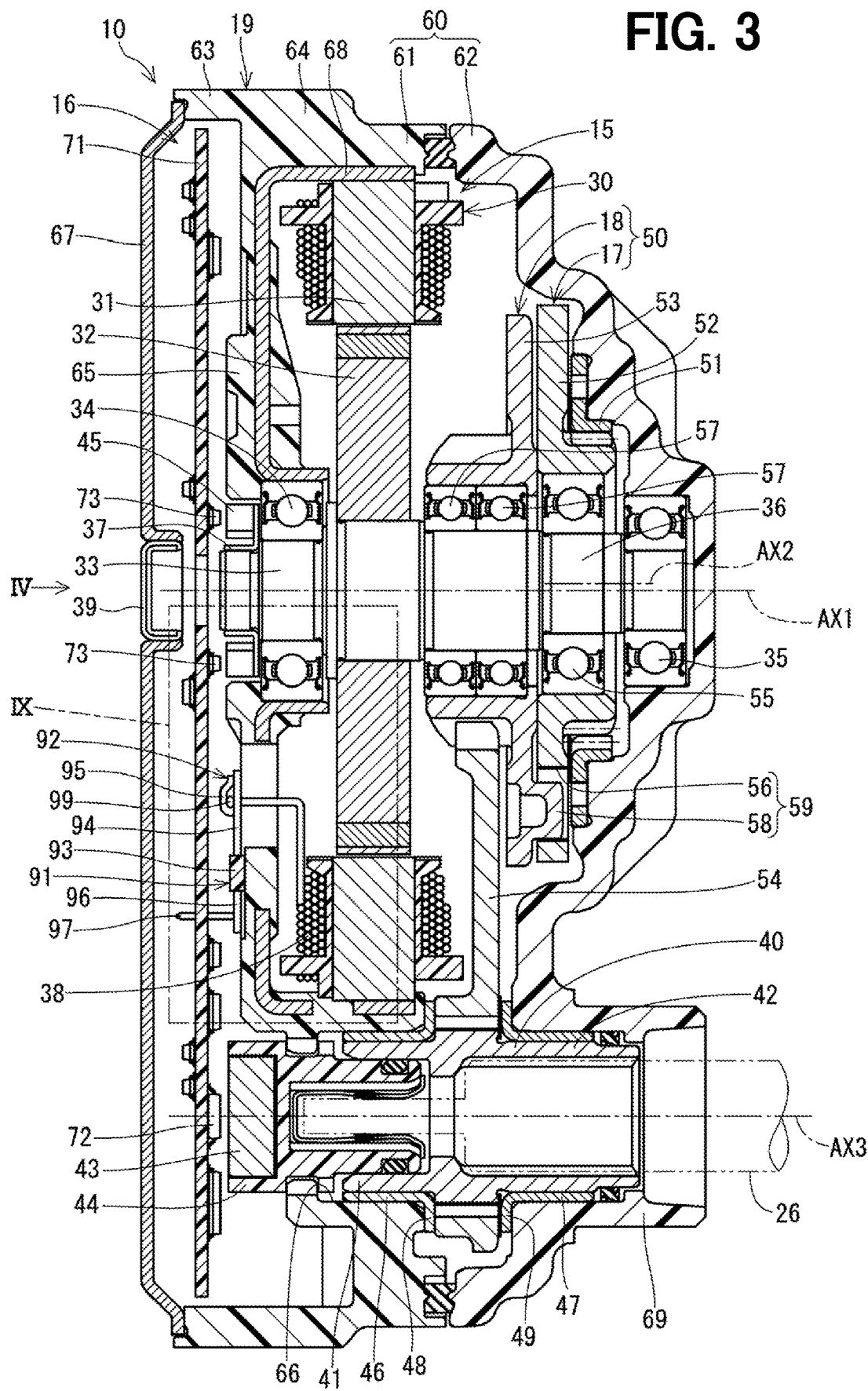
FIG. 3 is a cross-sectional view of the rotary actuator according to the first embodiment.
Figure 4:
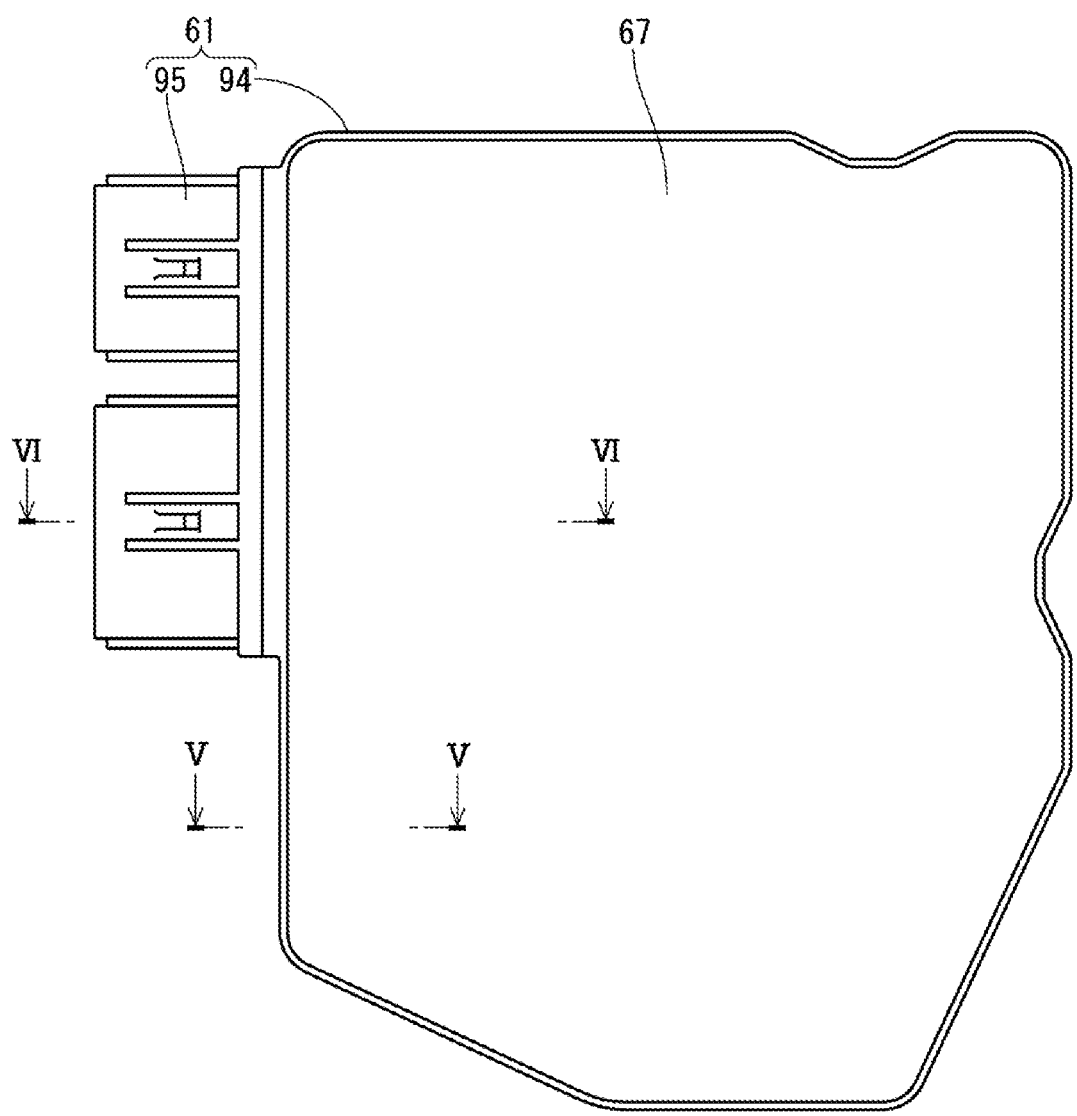
FIG. 4 is a view of the rotary actuator of FIG. 3 as viewed in direction IV.

Next, the configuration of the actuator 10 will be described. As shown in FIG. 3, the actuator 10 is an electromechanical integrated actuator having the operating unit 15 and the controller 16 in a housing 19.

The housing 19 includes a plate cover 67 and a case 60 including a cylindrical upper case 61 and a cup-shaped lower case 62. A partition 65 is formed between one end 63 and the other end 64 of the upper case 61. The controller 16 is housed inside the one end 63. The controller 16 is covered by a plate cover 67 provided at an opening of the one end 63, thereby ensuring shielding for the control substrate 71. The lower case 62 is attached to the other end 64. Further, the lower case 62 includes a cylindrical protrusion 69 that protrudes toward a side opposite to the upper case 61. The manual shaft 26 is inserted into the cylindrical protrusion 69.

The operating unit 15 includes the motor 30 as a driving power generator, an output shaft 40 arranged in parallel with the motor 30, and a speed-reducing mechanism 50 that reduces a rotational speed of the motor 30 and transmits the rotation to the output shaft 40. The operating unit 15 is housed in the case 60.

The motor 30 includes a stator 31 press-fitted into, and fixed to, a plate case 68 at the other end 64, a rotor 32 provided inside the stator 31, and a motor shaft 33 that rotates about a rotation axis AX1 together with the rotor 32. The motor shaft 33 is rotatably supported by both a bearing 34 disposed in the plate case 68 and a bearing 35 disposed in the lower case portion 62. Further, the motor shaft 33 has an eccentric portion 36 eccentric with the rotation axis AX1 at a position on a side of the rotor 32 close to the lower case portion 62. The motor 30 is able to rotate bidirectionally by controlling a current supplied to the coil 38 by the controller 16 and is also able to stop at desired rotational positions. A plug 39 is attached to a through hole of the plate cover 67. If a failure occurs, the motor shaft 33 can be forcibly rotated manually after detaching the plug 39.

The speed-reducing mechanism 50 has a first speed-reducing portion 17 including a ring gear 51 and a sun gear 52 and a second speed-reducing portion 18 including a drive gear 53 and a driven gear 54 as parallel shafts type gears. The ring gear 51 is coaxially disposed with the rotation axis AX1. The sun gear 52 is rotatably supported about the eccentric axis AX2 by a bearing 55 that is fitted into the eccentric portion 36. The sun gear 52 meshes with, and fits snugly inside, the ring gear 51. When the motor shaft 33 rotates, the sun gear 52 performs planetary motion in which the sun gear 52 revolves around the rotation axis AX1 and rotates about the eccentric axis AX2. At this time, the rotational speed of the sun gear 52 is reduced relative to the rotational speed of the motor shaft 33. The sun gear 52 has a hole 56 for rotation transmission.

The drive gear 53 is provided on the rotation axis AX1 and is rotatably supported about the rotation axis AX1 by a bearing 57 fitted into the motor shaft 33. Further, the drive gear 53 has a protrusion 58 for rotation transmission that is inserted into the hole 56. The rotation of the sun gear 52 is transmitted to the drive gear 53 through engagement between the hole 56 and the protrusion 58. The hole 56 and the protrusion 58 constitute a transmission mechanism 59. The driven gear 54 is provided on the rotation axis AX3 which is parallel to the rotation axis AX1 and coaxial with the cylindrical protrusion 69. The driven gear 54 meshes with the drive gear 53 to circumscribe the drive gear 53. When the drive gear 53 rotates about the rotation axis AX1, the driven gear 54 rotates about the rotation axis AX3. At this time, the rotational speed of the driven gear 54 is reduced relative to the rotational speed of the drive gear 53.

The output shaft 40 has a cylindrical shape, and is provided coaxially with the rotation axis AX3. The partition 65 has a through support hole 66 coaxial with the rotation axis AX3. The output shaft 40 is rotatably supported about the rotation axis AX3 by a first flanged bush 46 fitted into the through support hole 66 and a second flanged bush 47 fitted inside the cylindrical protrusion 69. The driven gear 54 is a separate component from the output shaft 40, is fitted outwardly to the output shaft 40, and is connected to the output shaft 40 to transmit rotation. The manual shaft 26 is inserted into the output shaft 40, and is coupled to the output shaft 40 through, for example, spline fitting so as to transmit rotation.

One end 41 of the output shaft 40 is rotatably supported by the first flanged bush 46. The other end 42 of the output shaft 40 is rotatably supported by the second flanged bush 47. The driven gear 54 is supported in the axial direction by being clamped between a first flange portion 48 of the first flanged bush 46 and a second flange portion 49 of the second flanged bush 47. In another embodiment, the driven gear 54 may be supported in the axial direction by being clamped between a pair of supporting portions such as the case 60 and another plate.

The controller 16 includes a plurality of electronic components for controlling the motor 30, the control board 71 on which the electronic components are implemented, an output shaft position detection sensor 72 implemented on the control board 71, and a motor position detection sensor 73 implemented on the control board 71.

The plurality of electronic components include a microprocessor 81, a MOSFET 82, a capacitor 83, a diode 84, an ASIC 85, an inductor 86, a resistor 87, a capacitor chip 88, and the like.

The output shaft position detection sensor 72 is disposed on the control board 71 at a position facing the magnet 43. The magnet 43 is fixed to a holder 44 attached to the output shaft 40. The output shaft position detection sensor 72 detects a rotational position of the output shaft 40 and the manual shaft 26 rotating together with the output shaft 40 by detecting a magnetic flux generated by the magnet 43.

The motor position detection sensor 73 is disposed on the control board 71 at a position facing the magnet 45. The magnet 45 is fixed to a holder 37 attached to the motor shaft 33. The motor position detection sensor 73 detects a rotational position of the motor shaft 33 and the rotor 32 by detecting a magnetic flux generated by the magnet 45.

(Board Fixing Structure)

Next, a fixing structure of the control board 71 and an electrical connection structure between the motor 30 and an external member (not shown) will be described. In the following description, the radial direction of the motor 30 is simply referred to as a "radial direction", the axial direction of the motor 30 is simply referred to as an "axial direction", and the circumferential direction of the motor 30 is simply referred to as a "circumferential direction".

As shown in FIGS. 3 to 6, the upper case 61 is made of resin, and has a plate case 68, a plurality of external connection terminals 92, and a primary molded body 93, all of which are embedded by insert molding.

The upper case 61 is a resin molded body that integrally has a housing 94 for housing the motor 30 and a connector 95 for external connection. The housing 94 includes the one end 63, the other end 64, and the partition 65. When connecting the controller 16 to the external member, the connector 95 is detachably connected to an external connector (not shown) of the external member.

Figure 6:
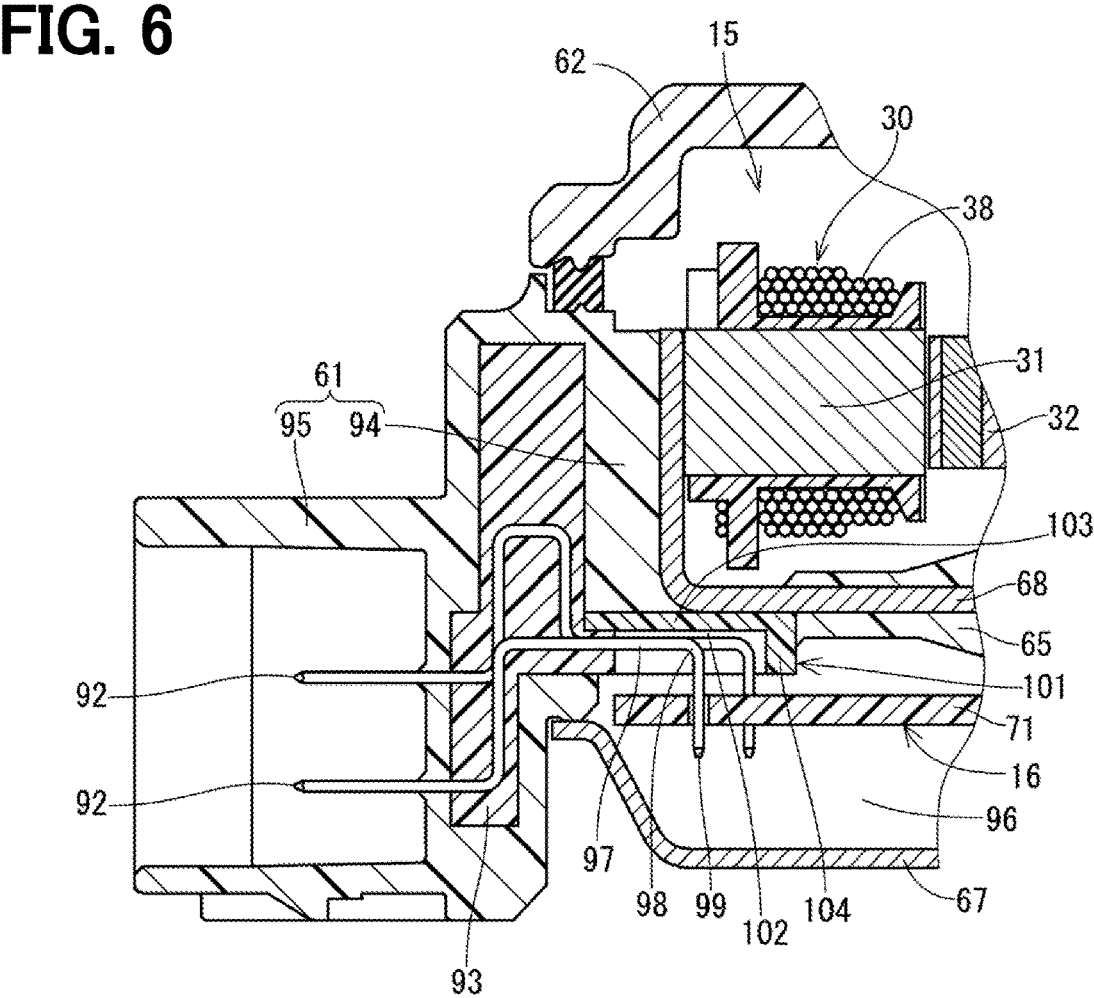
FIG. 6 is a sectional view of the rotary actuator taken along VI-VI line shown in FIG. 4.

As shown in FIG. 6, each of the external connection terminals 92 electrically connects the controller 16 to the external member. The external connection terminals 92 are connected to terminals of an external connector of the external member so that the controller 16 is electrically connected to the external member. The external connection terminals 92 are configured to allow for power supply and signal transmission between the controller 16 and the external member. The primary molded body 93 integrally holds the plurality of external connection terminals 92.

Figure 5:
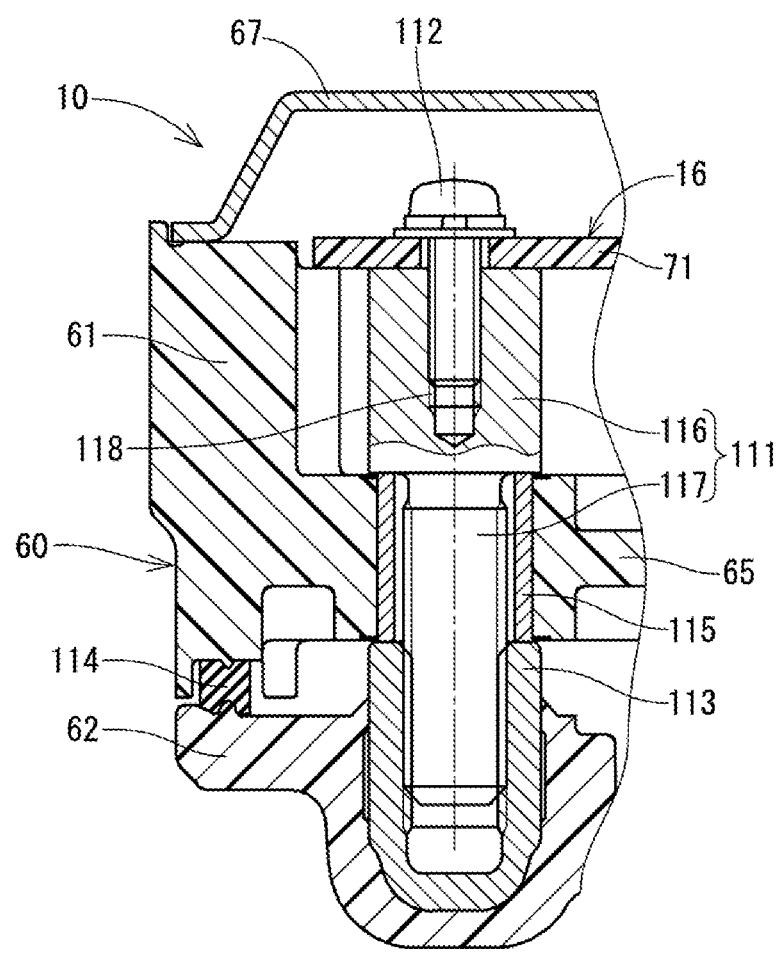
FIG. 5 is a sectional view of the rotary actuator of FIG. 4 taken along V-V line.

As shown in FIG. 5, the actuator 10 includes a bolt 111 as a metal case fastening member and a screw 112 as a board fixing member. The bolt 111 fastens the upper case 61 and the lower case 62, and the screw 112 fixes the control board 71 to the bolt 111.

The lower case 62 is made of resin, and an insert nut 113 is insert-molded with the lower case 62. A seal member 114 is applied to a contacting surface between the upper case 61 and the lower case 62. A collar 115 is formed by insert molding with the upper case 61. The bolt 111 has a head 116 and a screw portion 117. The head 116 is seated on the collar 115, and the screw portion 117 extends from the head 116 through the collar 115 to the insert nut 113 and is meshed with the insert nut 113. A female thread 118 is formed inside the head 116. The screw 112 is meshed with the female thread 118 and holds the control board 71 between the screw 112 and the head 116. The direction along which the screw 112 is inserted into the female thread 118 is the same as the direction along which the bolt 111 is inserted into the upper case 61. The control board 71 is rigidly fixed to the head 116 that is made of metal.

As shown in FIG. 6, each of the external connection terminals 92 has a bend 98 configured to reduce a stress that is generated due to temperature deformation or vibration and is applied to the connecting portions between the control board 71 and the external connection terminals 92. Specifically, each of the external connection terminals 92 includes a base 97 protruding into the installation space 96 of the control board 71 in the board extending direction, the bend 98 bent from the base 97 toward the control board 71, and a tip portion 99 extending from the bend 98 to the control board 71.

Here, a comparative example in which the connector is provided as a separate component from the upper case will be discussed. In the comparative example, there is a concern that the connector strength is insufficient with respect to the load generated when attaching/detaching the connector or the weight of the wire harness during its vibration. In addition, it would be necessary to apply a sealant between the connector and the upper case both of which are separately formed with each other. Since the connector needs to be fit into the upper case and be clamped from both upper and lower sides, it may be difficult to apply a sealant and, as a result, sufficient sealing between the connector and the upper case cannot be obtained.

On the contrary, in the first embodiment, by integrally forming the connector 95 with the housing portion 94 through resin molding, it is easy to secure a connecting force by the connector 95 as compared with the above-described comparative example in which the connector is attached to the case 60 as a separate component. Further, since no gap is formed between the connector 95 and the housing portion 94, there is no need to apply sealing therebetween. Therefore, a sufficient connecting force by the connector 95 and sealing for the case 60 can be ensured.

To enable the stress releasing structure of each of the external connection terminals 92 to work, it is necessary to prevent the bend 98 from being buried in the resin even when the connector 95 is formed integrally with the housing portion 94 by resin molding. That is, when the upper case 61 is molded, cutting the resin is required to prevent the resin from reaching the bend 98.

Figure 7:
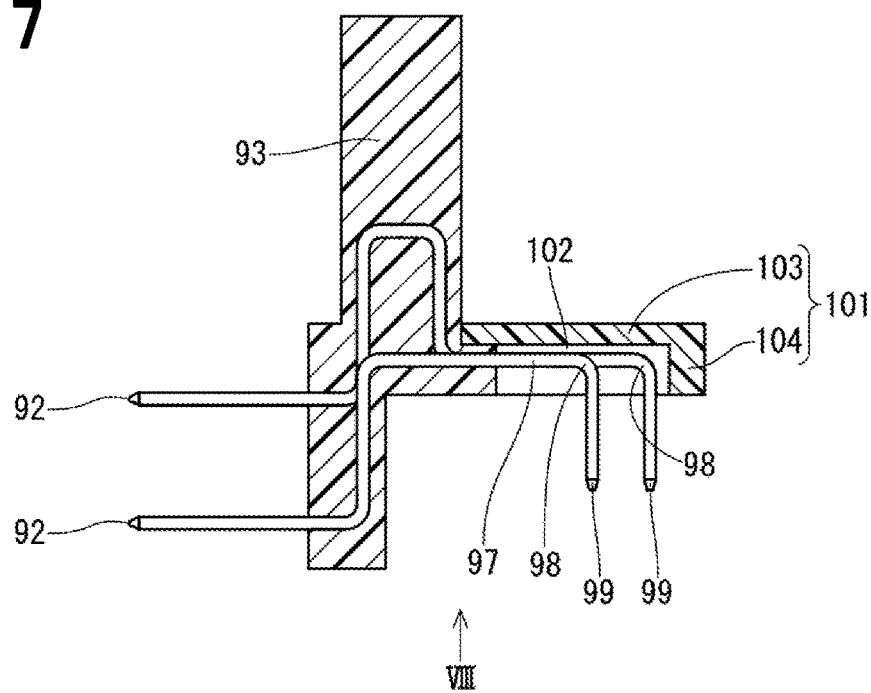
FIG. 7 is a view showing external connection terminals, a primary molded body, and a shielding member of FIG. 6.
Figure 8:
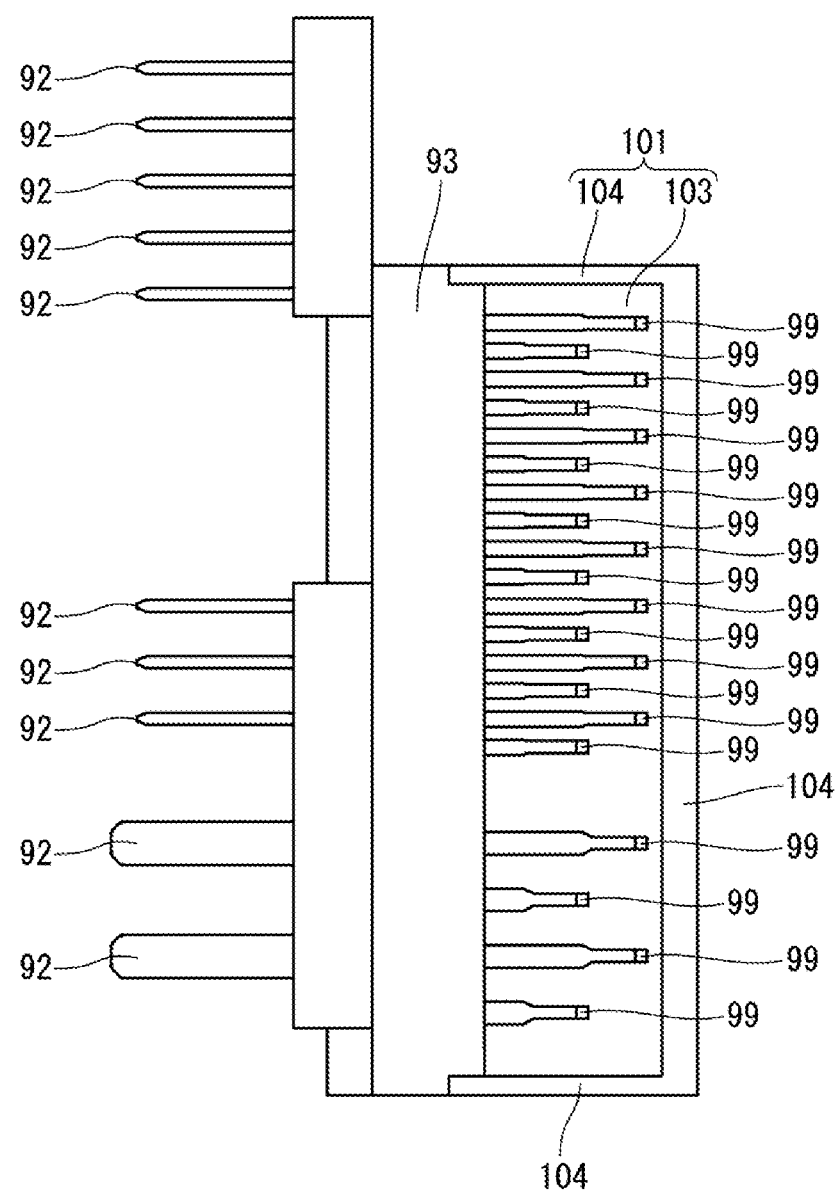
FIG. 8 is a view of the external connection terminals, the primary molded body, and the shielding member of FIG. 7 as viewed in direction VIII.
Figure 9:
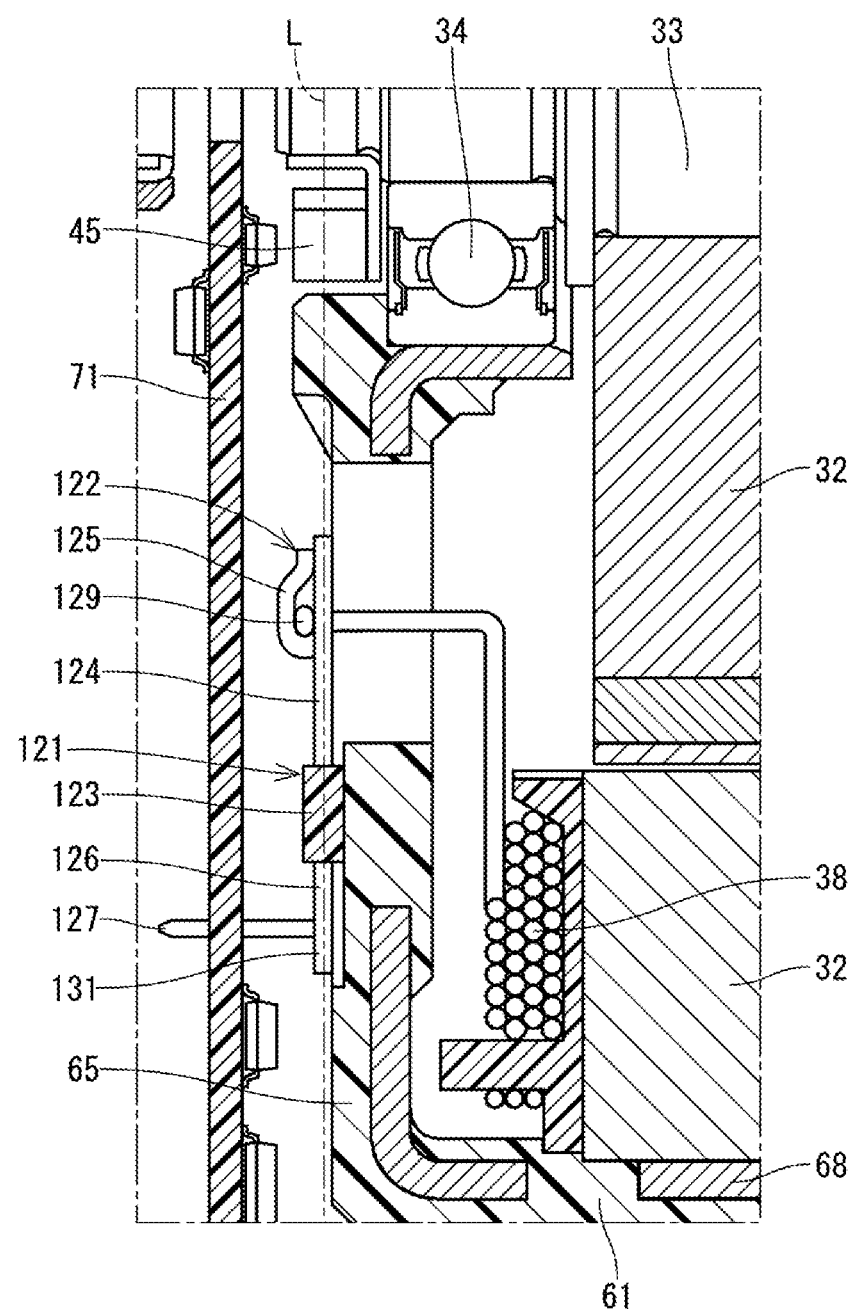
FIG. 9 is an enlarged view of IX part in FIG. 3.

In the first embodiment, as shown in FIGS. 6 to 8, the upper case 61 further includes a shielding member 101. The shielding member 101 is disposed between the upper case 61 and the base and bend 97, 98 to have a stress releasing space 102 between the upper case 61 and the base and bend 97, 98. The shielding member 101 includes a back wall 103 that is arranged on a side of the base 97 and the bend 98 opposite to the control board 71 and a circumferential wall 104 that is arranged to surround the base 97 and the bend 98.

The shielding member 101 is installed in a secondary molding die while being fitted to the primary molded body 93 when the upper case 61 is secondary-molded. Then, the shielding member 101 cuts the resin so that a molten resin injected into the secondary molding die reaching the bend 98. In the first embodiment, the circumferential wall 104 is provided to protrude toward the control board 71 than the partition 65 protrudes, and therefore cutting the resin can be reliably performed.

As shown in FIGS. 3 and 9 to 11, the actuator 10 includes a busbar 121. The busbar 121 has a plurality of motor connection terminals 122 that electrically connect the coil 38 to the control board 71. The busbar 121 also includes a resin holding member 123 that molds a part of each of the motor connection terminals 122. The holding member 123 is made of resin and is an insulator.

The holding member 123 is a separate member from the housing 19, is formed in an annular shape, and is coaxially disposed with the stator 31. The partition 65 of the upper case 61 has a portion facing the control board 71, and the holding member 123 is fixed to the portion of the partition 65 by, for example, heat swaging.

The motor connection terminals 122 are arranged in the circumferential direction. Each of the motor connection terminals 122 includes a motor-side extending portion 124, a fusing portion 125, a board-side extending portion 126, and a connecting pin 127. The motor-side extending portion 124 extends radially inward from the holding member 123. The fusing portion 125 is disposed at an end of the motor-extending portion 124 and is connected to a coil end 129 of the coil 38. The board-side extending portion 126 extends radially outward from the holding member 123. The connecting pin 127 protrudes from the board-side extending portion 126 toward the control board 71 and is connected to the control board 71.

The holding member 123 molds a connecting portion between the motor-side extending portion 124 and the board-side extending portion 126. The fusing portion 125 is compressedly attached to the coil end 129 by fusing. The connecting pin 127 is connected to the control board 71 by, for example, soldering or snap fitting.

Figure 10:
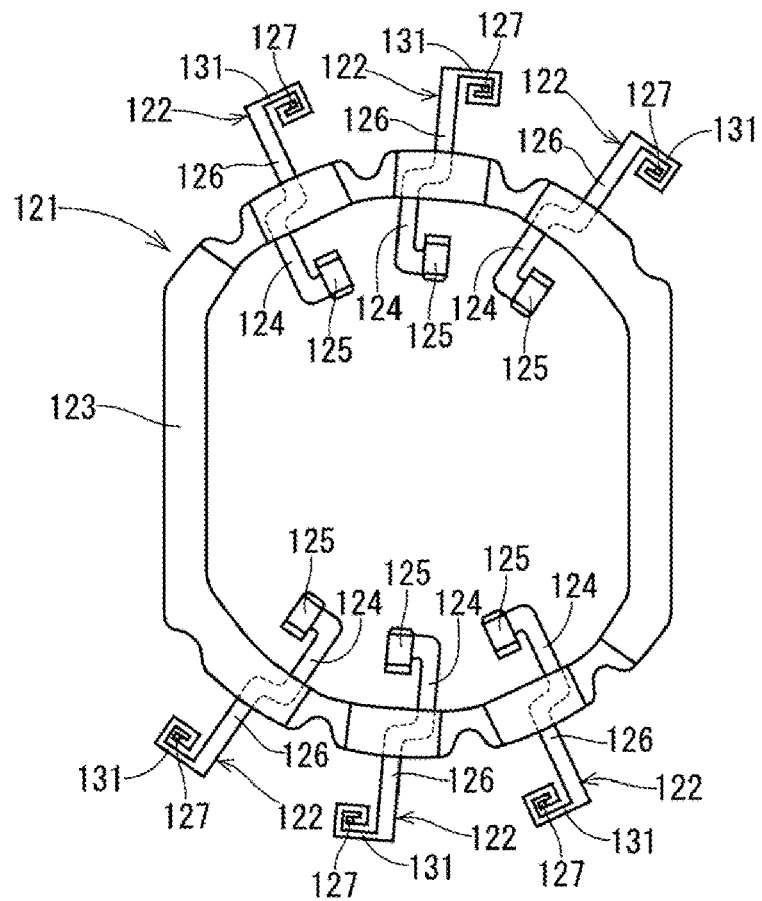
FIG. 10 is a view of the busbar of FIG. 3 viewed in direction X.
Figure 11:
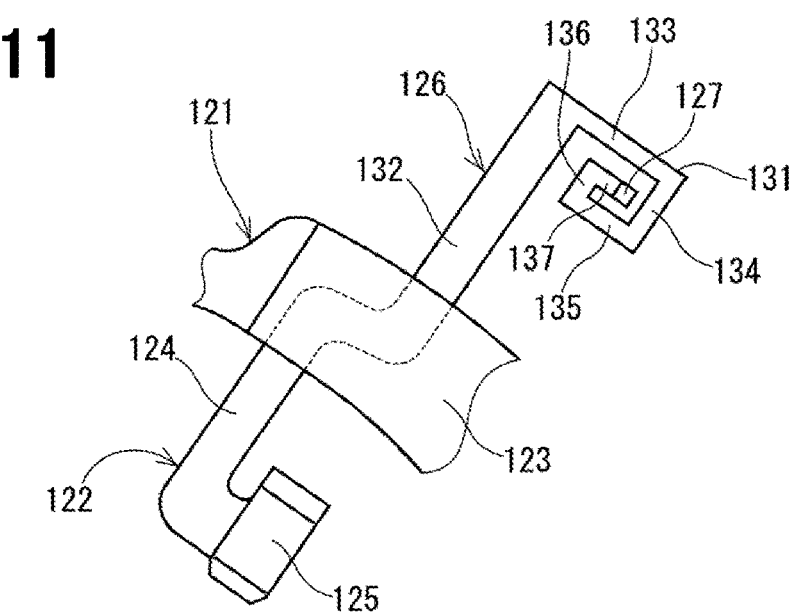
FIG. 11 is an enlarged view of one motor terminal of FIG. 10.

The board-side extending portion 126 includes a bend portion 131. The bend portion 131 serves as a stress releasing section whose extending direction varies at least twice along an imaginary plane L (see FIG. 9) parallel to the control board 71. FIG. 10 shows the busbar 121 viewed in a direction perpendicular to the imaginary plane L. In the present embodiment, the bend portion 131 is disposed at a tip of a base 132 that extends radially outward from the holding member 123 (see FIG. 11). More specifically, the bend portion 131 includes a first linear portion 133, a second linear portion 134, a third linear portion 135, a fourth linear portion 136, and a fifth linear portion 137. The first linear portion 133 linearly extends from a distal end of the base 132 in a substantially circumferential direction of the holding member 123. The second linear portion 134 linearly extends substantially, radially inward from one end of the first linear portion 133. The third linear portion 135 linearly extends in the substantially circumferential direction of the holding member 123 from one end of the second linear portion 134. The fourth linear portion 136 linearly extends substantially, radially outward from one end of the third linear portion 135. The fifth linear portion 137 linearly extends from one end of the fourth linear portion 136 in the substantially circumferential direction. The first to fifth linear portions 133 to 137 have extending directions that vary intermittently. The first to fifth portions 133 to 137 form a spiral shape. The connecting pin 127 is formed to protrude from the center of the spiral shape, that is, one end of the fifth linear portion 137.

By the cooperation of the linear portions 103 to 107, the bend portion 131 can be deformed to follow a movement of the control board 71 in various directions relative to the busbar 127. Therefore, even though the extending directions of the motor connection terminals 122 are different from each other, stress due to temperature deformation or vibration applied to the connecting portions with the control board 71 can be reduced for all the motor connection terminals 122.

As described above, in the first embodiment, the upper case portion 61 is made of resin. Thus, the weight of the case 60 can be reduced and the corrosion resistance can be improved. As a result, the weight of the actuator 10 can be reduced, and sealing for the case 60 can be ensured.

In order to ensure the vibration resistance of the controller 16, the control board 71 needs to be fixed to a metal component. Therefore, for example, an insert nut, as a metal component, may be integrally formed with the upper case and the board may be fixed to the insert nut. However, there is a concern that the size of the upper case may be increased to house the insert nut and, as a result, the size of the rotary actuator may be increased.

In this regard, the actuator 10 according to the first embodiment includes the bolt 111 as a "metal case fastening member" and the screw 112 as a "board fixing member". The bolt 111 fastens the upper case 61 and the lower case 62, and the screw 112 fixes the control board 71 to the bolt 111.

By fixing the control board 71 using the metal bolt 111 in this way, it is not necessary to provide an insert nut in the upper case section 61, although the vibration resistance of the control section 16 is secured. This can prevent the actuator 10 from increasing in physical size. In addition, by having the bolt 111 with the function equivalent to an insert nut for fixing the board, the insert nut is not necessary, and thus the number of components can be reduced.

By reducing the weight and size of the actuator 10 as described above, the mountability and vibration resistance can be improved.

In the first embodiment, the female thread 118 is formed in the head 116 of the bolt 111, and the screw 112 is screwed into the female thread 118. Thus, the control board 71 can be fixed with the screw 112 using the metal bolt 111.

In the first embodiment, the direction along which the screw 112 is inserted into the female thread 118 is the same as the direction along which the bolt 111 is inserted into the upper case 61. Thus, after the bolt 111 is tightened, the screw 112 can be tightened without inverting the upper case 61. Therefore, the assemblability is improved.

As described above, the control board 71 is rigidly fixed to the metal component by the screw 112 screwing the control board 71. Thus, stress due to temperature deformation or vibration is applied to connecting portions between the control unit and terminals, and there may be a concern that a crack is generated in the connecting portions.

In this regard, in the first embodiment, each of the external connection terminals 92 that is embedded in the upper case 61 has the bend 98 bent in the board installation space 96 in the upper case 61. Therefore, stress due to temperature deformation or vibration applied to the connecting portion between the control board 71 and the external connection terminals 92 can be reduced, and therefore reliability can be improved.

In the first embodiment, each of the motor terminals 122 of the busbar 121 has the bend portion 131 bent in the board installation space 96 in the upper case portion 61. Therefore, stress due to temperature deformation or vibration applied to the connecting portion between the control board 71 and the motor connection terminals 122 can be reduced, and reliability can be improved.

Other Embodiments

In another embodiment, the control board is not limited to the screw, and may be fixed to the head of the bolt by another fastening member. In other embodiments, the screw insertion direction may be different from the bolt insertion direction. In another embodiment, the motor connection terminal is not limited to the spiral shape, and may have another shape such as an L shape, a C shape, or a wave shape, or a shape in which a straight portion and a curved portion are combined. In another embodiment, the busbar may be formed integrally with the upper case, or may be fixed to another member such as a stator.

The present disclosure is not limited to the embodiments described above, and can be implemented in various forms without departing from the spirit of the invention.

The invention claimed is:
1. A rotary actuator used in a shift-by-wire system for a vehicle, the actuator comprising:
a motor;
a controller that controls the motor;
an upper case that is made from resin and houses the controller;

a lower case that houses the motor together with the upper case;

a case fastening member that is made from metal and fastens the upper case and the lower case to each other; and a board fixing member that fixes a board of the controller to the case fastening member, wherein the lower case is made of resin and an insert nut is insert-molded with the lower case, the case fastening member includes a head and a screw portion extending from the head, the screw portion is meshed with the insert nut, the case fastening member is a bolt having a female thread formed on the head, and the board fixing member is a screw that meshes with the female thread.

2. The rotary actuator according to claim 1, wherein the screw is inserted into the female thread along a same direction as a direction along which the bolt is inserted into the upper case.

3. The rotary actuator according to claim 1, wherein an external connection terminal that connects the controller to an external member is embedded in the upper case, and the external connection terminal has a bend bent in a board installation space defined in the upper case.

4. The rotary actuator according to claim 1, wherein the controller is electrically connected to the motor by a busbar, and the busbar includes a motor terminal that has a bend portion bent in a board installation space defined in the upper case.

5. The rotary actuator according to claim 1, wherein a collar is insert-molded with the upper case, the screw portion is inserted into the collar, and the collar is interposed between the head and the insert nut.

6. The rotary actuator according to claim 1, wherein the board fixing member fixes the board of the controller to the head of the case fastening member.

* * * * *